(12) United States Patent
Rajagopalan

(10) Patent No.: US 6,559,226 B2
(45) Date of Patent: *May 6, 2003

(54) GOLF BALL COMPOSITIONS BASED ON ANIONIC POLYMERS

(75) Inventor: Murali Rajagopalan, South Dartmouth, MA (US)

(73) Assignee: Achushnet Company, Fairhaven, MA (US)

( * ) Notice: Subject to any disclaimer, the term of this patent is extended or adjusted under 35 U.S.C. 154(b) by 7 days.

This patent is subject to a terminal disclaimer.

(21) Appl. No.: 09/840,119

(22) Filed: Apr. 24, 2001

(65) Prior Publication Data

US 2001/0014716 A1 Aug. 16, 2001

Related U.S. Application Data

(63) Continuation of application No. 09/219,348, filed on Dec. 23, 1998, now Pat. No. 6,221,960.

(51) Int. Cl.⁷ .......................... A63B 37/02; A63B 37/12
(52) U.S. Cl. ............................. 525/57; 525/56; 525/58; 525/60; 473/354; 473/365; 473/372; 473/373; 473/385
(58) Field of Search .................... 525/56, 57, 58, 525/60; 473/354, 365, 372, 373, 385

(56) References Cited

U.S. PATENT DOCUMENTS

| | | | |
|---|---|---|---|
| 4,526,375 A | 7/1985 | Nakade | 273/235 R |
| 4,888,814 A | 12/1989 | Yamaguchi et al. | 273/235 R |
| 4,986,545 A | 1/1991 | Sullivan | 273/235 R |
| 5,120,791 A | 6/1992 | Sullivan | 525/196 |
| 5,155,157 A | 10/1992 | Statz et al. | 524/423 |
| 5,298,571 A | 3/1994 | Statz et al. | 525/330 |
| 5,321,089 A | 6/1994 | Cadorniga et al. | 525/196 |
| 5,324,783 A | 6/1994 | Sullivan | 525/196 |
| 5,359,000 A | 10/1994 | Hamada et al. | 525/74 |
| 5,397,840 A | 3/1995 | Sullivan et al. | 525/221 |
| 5,415,937 A | 5/1995 | Cadorniga et al. | 428/407 |
| 5,422,398 A | 6/1995 | Weiss | 525/178 |
| 5,492,972 A | 2/1996 | Stefani | 525/196 |
| 5,514,847 A | 5/1996 | Makishima et al. | 525/221 |
| 5,692,974 A | 12/1997 | Wu et al. | 473/377 |
| 5,703,166 A | 12/1997 | Rajagopalan et al. | 525/196 |
| 5,827,466 A | 10/1998 | Yamaguchi | 264/279 |
| 5,957,786 A | 9/1999 | Aoyama | 473/379 |
| 5,971,870 A | 10/1999 | Sullivan et al. | 473/373 |
| 6,221,960 B1 * | 4/2001 | Rajagopalan | |

FOREIGN PATENT DOCUMENTS

| | | |
|---|---|---|
| GB | 1383422 | 2/1975 |
| JP | 007403 | 1/1983 |
| JP | 109969 | 4/1992 |
| JP | 6192512 A | 7/1994 |
| JP | 099116 | 4/1997 |

* cited by examiner

Primary Examiner—David J. Buttner
(74) Attorney, Agent, or Firm—Swidler Berlin Shereff Friedman, LLP

(57) ABSTRACT

The present invention provides golf balls having a cover, a core, and optionally one or more intermediate layers between the cover and the core, wherein at least one of the cover, the core and, if present, the intermediate layer or layers, includes an anionic polymer. The anionic polymer has at least one of a neutralizable hydroxyl or dealkylable ether group, at least a portion of which are neutralized or dealkylated by a metal ion to provide anionic moieties. The anionic polymer compositions of the present invention can be used to provide improved characteristics to golf balls made therefrom.

35 Claims, 1 Drawing Sheet

GOLF BALL COMPOSITIONS BASED ON ANIONIC POLYMERS

CROSS-REFERENCE TO RELATED APPLICATION

This application is a continuation of application Ser. No. 09/219,348 filed Dec. 23, 1998 now U.S. Pat. No. 6,221,960, the disclosure of which is hereby incorporated herein by express reference thereto.

FIELD OF THE INVENTION

The present invention relates to golf balls and, in particular, to polymeric compositions useful in golf ball covers, cores, and intermediate layers between the cover and the core. The polymeric compositions include at least one anionic polymer which has neutralizable hydroxyl and/or dealkylable ether groups, at least a portion of which are neutralized by a metal ion to provide anionic groups attached to the polymer.

BACKGROUND OF THE INVENTION

Three-piece, wound-core golf balls with balata (trans-polyisoprene) covers are typically preferred by professional and low handicap amateur golfers. These balls provide a combination of distance, high spin rate, and control that is not available with other types of golf balls. However, balata is easily damaged in normal play, and thus lacks the durability required by the average golfer.

Two-piece golf balls, which are typically used by the average amateur golfer, provide a combination of durability and maximum distance that is not available with balata covered balls. These balls comprise a core, formed of a solid sphere which typically comprises a polybutadiene-based compound, encased in an ionomer cover, such as SUR-LYN®. Golf ball cover ionomers are, typically, copolymers of an olefin and an unsaturated carboxylic acid in which at least a portion of the carboxylic acid groups have been neutralized with a metal ion, typically sodium or zinc. These balls are extremely durable, have good shear resistance, and are difficult to cut. However, this durability results from the hardness of the ionomer, which gives such balls a very hard "feel" when struck, which many golfers find inferior to the softer "feel" of a balata covered ball. In addition, the hardness of the ionomer gives the balls a lower spin rate, making these balls more difficult to control.

Many attempts have been made to produce a golf ball with the control and feel of a wound balata ball, and the durability of an ionomer covered two-piece ball. These attempts have focused largely on modifying the properties of ionomer compositions by forming ionomer blends.

For example, U.S. Pat. Nos. 4,884,814, 5,120,791, 5,324,783, 5,415,937 and 5,492,972 disclose ball compositions which are blends of high-hardness ionomers and low-hardness ionomers. Other patents disclose blends of ionomers and nonionic polymers, such as U.S. Pat. Nos. 5,397,840, 5,516,847, 5,703,166. These patents attempt to overcome the inherent immiscibility of ionomers and non-ionic polymers by adding polar functionalities to the non-ionic polymers (see, e.g., U.S. Pat. Nos. 4,986,545 and 5,359,000), or by adding compatibilizers to provide or enhance the compatibility of the two polymer species (see, e.g., U.S. Pat. Nos. 5,155,157 and 5,321,089, and Japanese patent application 6,192,512 (1994)). Still other patents disclose blends of normally immiscible or poorly miscible non-ionomer polymers with compatibilizers (see, e.g., U.S. Pat. No. 5,422,398).

U.S. Pat. No. 4,526,375 discloses golf balls having improved low temperature impact resistance including a cover composition having an ionic polymer with at least two different metal ions in one molecule.

U.S. Pat. No. 5,692,974 discloses compositions using cationic polymers having positively charged quaternary ammonium groups. The cationic groups, preferably present in cationic polyurethane polymers, impart improved characteristics to golf ball covers formed therefrom.

Notwithstanding these efforts, there is no known prior art disclosure of the use of anionic polymers having anionic groups derived from other, non-carboxylic acid, neutralizable moieties, such as hydroxyl and dealkylable moieties, such as ether groups, to form golf balls. Such anionic polymers would have desirable hydrogen bonding or dipole interactions as well as ionic interactions which can be utilized to impart improved characteristics to golf ball cores, covers, and intermediate layers, such as improved durability and resiliency.

Thus, there has now been discovered surprisingly improved golf ball-forming compositions comprising anionic polymers having anionic moieties derived from neutralizable hydroxyl and/or dealkylable ether groups, which, when used to form golf balls, produce balls which unexpectedly remedy the deficiencies of the prior art materials discussed above.

SUMMARY OF THE INVENTION

The present invention is directed to golf balls comprising a cover, a core, and optionally one or more intermediate layers disposed between the cover and the core, wherein at least one of the cover, the core and, if present, the intermediate layer or layers, comprises an anionic polymer having neutralizable hydroxyl and/or dealkylable ether groups, wherein the golf ball has a coefficient of restitution of greater than about 0.7 and a compression of at least about 50, the cover has a thickness of at least about 0.03 inches and at least about 60 percent dimple coverage, and the anionic polymer has a flexural modulus from about 500 psi to 300,000 psi, a hardness of at least about 15 Shore A, a specific gravity of at least about 0.7, a dynamic shear storage modulus of at least about $10^4$ dyn/cm$^2$, and a loss tangent of less than about 1 at about 23° C. At least a portion of the neutralizable or dealkylable groups are neutralized by a metal base to leave anionic moieties attached to the polymer.

The anionic polymer comprises repeating units of formula (Ia):

wherein $R_1$, is OH, OC(O)$R_5$, O$^-$M$^{+V}$, (CH$_2$)$_n$R$_b$, (CHR$_z$)$_n$R$_b$, or aryl, wherein n is at least 1, $R_5$ is a lower alkyl, M is a metal ion, V is an integer from 1 to 5, R$_b$ is OH, OC(O)R$_5$, O$^-$M$^{+V}$, and R$_z$, is a lower alkyl or aryl, $R_2$, $R_3$ and $R_4$ are each independently selected from the group consisting of hydrogen, straight-chain or branched-chain lower alkyl, and substituted alkyl in which one or more hydrogen atoms is replaced by a substituent selected from the group consisting of COOH, SO$_3$H, NH$_2$ or a lower alkyl substituted or di-substituted amine, halogen, OH, SH, silicone, and lower alkyl ether.

In a preferred embodiment, the anionic polymer is a copolymer of substituted or unsubstituted ethylene and substituted or unsubstituted vinyl alcohol, acetate, p-hydroxy styrene, or p-methoxy styrene. Thus, in this embodiment, the anionic copolymer is a random, block, or alternating copolymer of units (Ia) and (Ib), where units (Ib) have the formula

wherein $R_6$, $R_7$, $R_8$ and $R_9$ are each independently selected from the group as defined above for $R_2$. In a preferred embodiment, each of $R_2$, $R_3$, $R_4$, $R_6$, $R_7$, $R_8$ and $R_9$ is hydrogen. In another preferred embodiment, $R_5$ is methyl.

In one embodiment, the units Ia are present in amounts from about 1 to 99 weight percent and units Ib are present in amounts from about 99 to 1 weight percent.

In a more preferred embodiment, the anionic polymer is a copolymer of ethylene and vinyl alcohol, vinyl acetate, i.e., $R_1$, is OH or $OC(O)CH_3$, p-hydroxy styrene, or p-methoxy styrene, and the remaining R groups are hydrogen.

In another embodiment, the anionic polymer is a copolymer or terpolymer of formula (II):

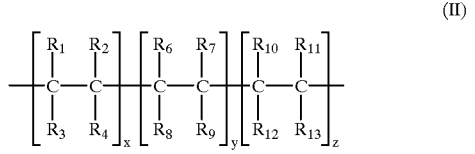

wherein:

$R_1$–$R_9$ are each independently selected from the groups defined above;

$R_{10}$–$R_{12}$ are each independently selected from the group as defined above for $R_2$; and $R_{13}$ is OH or $OC(O)R_{14}$, where $R_{14}$ is a lower alkyl;

the remaining R groups are each independently selected from the group consisting of hydrogen, straight-chain or branched-chain lower alkyl, and substituted alkyl in which one or more hydrogen atoms is replaced by a substituent selected from the group consisting of COOH, $SO_3H$, $NH_2$ or a lower alkyl substituted or di-substituted amine, halogen, OH, SH, silicone, lower alkyl ether, and lower alkyl ether;

x ranges from about 99 to 50 weight percent of the polymer, y ranges from about 1 to 50 weight percent of the polymer, and z ranges from about 0 to 50 weight percent of the polymer; and wherein at least a portion of the neutralizable groups are neutralized with a metal ion.

The anionic polymers of the present invention can be mixed with one or more additional ionic and non-ionic polymers, present in an amount of about 1 to 99 percent by weight, preferably about 5 to 80 percent, based on the total weight of the anionic polymer and the additional polymer. Preferred additional polymers include polyvinyl alcohol or a copolymer of ethylene and vinyl alcohol, styrene-allyl alcohol, or ethylene-allyl alcohol copolymer.

In a preferred embodiment, the anionic polymer has a flexural modulus of from about 2,000 to 200,000 psi. In yet another embodiment, the metal ion is an ion of an alkali metal, an alkaline earth metal, a transition metal, a Group III metal, or a Group IV metal. In a preferred embodiment, the alkali metal is lithium, sodium or potassium; the alkaline earth metal is magnesium; and the transition metal is titanium, zirconium, tungsten or zinc.

In one optional, but preferred, embodiment, the at least one intermediate layer is disposed between the cover and the core. In another optional, but more preferred, embodiment, said intermediate layer is formed of a composition which comprises an anionic polymer having at least one of a neutralizable hydroxyl or dealkylable ether group, and at least a portion of the neutralizable or dealkylable groups are neutralized with a metal ion.

In one embodiment, the core contains at least one solid, hollow, or fluid portion. In another embodiment, at least one of the intermediate layers includes a tensioned elastomeric material. In yet another embodiment, at least a portion of at least one of the core, the at least one intermediate layer, and the cover is foamed, comprises a density-modifying filler, or both.

DETAILED DESCRIPTION OF THE INVENTION

Figure 1:
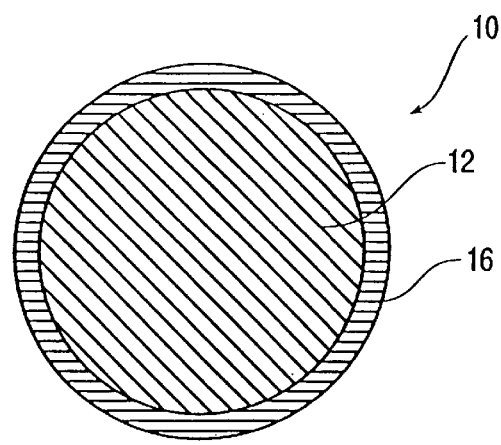
FIG. 1 is a cross-sectional view of a two-piece golf ball according to the invention having a cover and a core.

In one embodiment, the present invention relates to golf ball forming compositions comprising an anionic polymer having anionic groups derived from neutralization of hydroxyl and/or dealkylable ether groups, wherein the polymer has a flexural modulus from about 500 psi to 300,000 psi, a hardness of at least about 15 Shore A, a specific gravity of at least about 0.7, a dynamic shear storage modulus of at least about $10^4$ $dyn/cm^2$, and a loss tangent of less than about 1. The dynamic shear storage is defined according to ASTM Standards D4092-90, D4065-94, and D5279-93. The anionic polymers useful in the present invention include any homopolymer, copolymer or terpolymer having neutralizable hydroxyl and/or dealkylable ether groups, and in which at least a portion of the neutralizable or dealkylable groups are neutralized or dealkylated with a metal ion.

As used herein "neutralizable" or "dealkylable" groups refer to a hydroxyl or ether group pendent from the polymer chain and capable of being neutralized or dealkylated by a metal ion, preferably a metal ion base. These neutralized polymers have improved properties critical to golf ball performance, such as resiliency, impact strength and toughness and abrasion resistance. Suitable metal bases are ionic compounds comprising a metal cation and a basic anion. Examples of such bases include hydroxides, carbonates, acetates, oxides, sulfides, and the like.

The particular base to be used depends upon the nature of the hydroxyl or ether compound to be neutralized or dealkylated, and is readily determined by one skilled in the art. Preferred anionic bases include hydroxides, carbonates, oxides and acetates.

The metal ion can be any metal ion which forms an ionic compound with the anionic base. The metal is not particularly limited, and includes alkali metals, preferably lithium, sodium or potassium; alkaline earth metals, preferably magnesium or calcium; transition metals, preferably titanium, zirconium, or zinc; and Group III and IV metals. The metal ion can have a +1 to +5 charge. Most preferably, the metal is lithium, sodium, potassium, zinc, magnesium, titanium, tungsten, or calcium, and the base is hydroxide, carbonate or acetate.

The anionic polymers useful in the present invention include those which contain neutralizable hydroxyl and/or dealkylable ether groups. Exemplary polymers include ethylene vinyl alcohol copolymers, polyvinyl alcohol, polyvinyl acetate, poly(p-hydroxymethylene styrene), and p-methoxy styrene, to name but a few. It will be apparent to one skilled in the art that many such polymers exist and thus can be used in the compositions of the invention. Thus, in one embodiment, the anionic polymer comprises repeating units of formula (Ia):

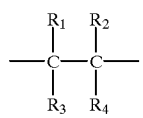

(Ia)

where $R_1$ is OH, $OC(O)R_5$, $O^-M^{+V}$, $(CH_2)_nR_b$, $(CHR_2)_nR_b$, or aryl, wherein n is at least 1, $R_5$ is a lower alkyl, M is a metal ion, V is an integer from 1 to 5, $R_b$ is OH, $OC(O)R_5$, $O^-M^{+V}$, and $R_z$ is a lower alkyl or aryl, and $R_2$, $R_3$ and $R_4$ are each independently hydrogen, straight-chain or branched-chain lower alkyl. $R_2$, $R_3$ and $R_4$ may also be similarly substituted. Preferably n is from 1 to 12, more preferably 1 to 4.

The term "substituted," as used herein, means one or more hydrogen atoms has been replaced by a functional group. Functional groups include, but are not limited to, hydroxyl, amino, carboxyl, sulfonic, amide, ether, ether, phosphates, thiol, nitro, silane, and halogen, as well as many others which are quite familiar to those of ordinary skill in this art.

The terms "alkyl" or "lower alkyl," as used herein, includes a group of from about 1 to 30 carbon atoms, preferably 1 to 10 carbon atoms.

In the anionic polymers useful in the present invention, at least a portion of the neutralizable or dealkylable groups of $R_1$ are neutralized or dealkylated by a metal base to form the corresponding anionic moiety. The metal ion of the metal base remains associated with the anionic polymer moiety, to form an $O^-M^{+V}$ group, where $M^{+V}$ is a metal cation of charge V. The portion of the neutralizable or dealkylable groups which are neutralized or dealkylated can be between about 1 to 100 weight percent, preferably between about 5 to 50 weight percent.

Neutralization or dealkylation may be performed by melting the polymer first, then adding a metal ion in an extruder. The degree of neutralization or dealkylation is controlled by varying the amount of metal ion added. Any method of neutralization or dealkylation available to those of ordinary skill in the art may also be suitably employed.

In one embodiment, the anionic polymer is repeating units of fonnula (Ia), as described above. In a preferred embodiment, $R_2$, $R_3$, and $R_4$ are hydrogen, and $R_1$ is hydroxyl, i.e., the anionic polymer is a polyvinyl alcohol homopolymer in which a portion of the hydroxyl groups have been neutralized with a metal base. In another preferred embodiment, $R_2$, $R_3$, and $R_4$ are hydrogen, and $R_1$ is $OC(O)R_5$, and $R_5$ is methyl, i.e., the anionic polymer is a polyvinyl acetate homopolymer in which a portion of the methyl ether groups have been neutralized with a metal base.

The anionic polymer can also be a copolymer of two different repeating units of formula (Ia) having different substituents, or a terpolymer of three different repeating units of formula (Ia). In this embodiment, the polymer can be a random copolymer, an alternating copolymer, or a block copolymer, where the term "copolymer" includes terpolymers.

In another embodiment, the anionic polymer is a copolymer of units (Ia) and (Ib), as described above, where units (Ib) have the formula:

(Ib)

wherein $R_6$, $R_7$, $R_8$ and $R_9$ are each independently selected from the group defined above for $R_2$. Units of formula (Ia) can comprise from about 1 to 99 percent weight percent of the polymer, preferably from about 5 to 50 weight percent, and units of formula (Ib) can comprise from about 99 to 1 weight percent, preferably from about 95 to 50 weight percent. In one preferred embodiment, the anionic polymer is a random, alternating or block copolymer of units (Ia) and (Ib) wherein $R_1$ is hydroxyl, and each of the remaining R groups is hydrogen, i.e., the polymer is a copolymer of ethylene and vinyl alcohol. In another preferred embodiment, the anionic polymer is a random, alternating or block copolymer of units (Ia) and (Ib) wherein $R_1$ is $OC(O)R_5$, where $R_5$ is methyl, and each of the remaining R groups is hydrogen, i.e., the polymer is a copolymer of ethylene and vinyl acetate.

In another embodiment, the anionic polymer is an anionic polymer having neutralizable hydroxyl and/or dealkylable ether groups of formula (II):

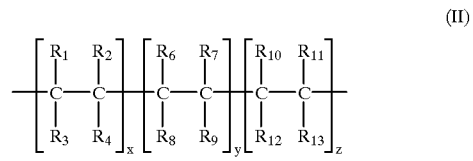

(II)

wherein:
  $R_1$–$R_9$ and $R_b$ and $R_z$ are as defined above;
  $R_{10}$–$R_{12}$ are each independently selected from the group as defined above for $R_2$; and
  $R_{13}$ is OH or $OC(O)R_{14}$, where $R_{14}$ is a lower alkyl; wherein x, y and z indicate relative weight percent of the different units. x can be from about 99 to 50 weight percent of the polymer, y can be from about 1 to 50 weight percent of the polymer, and z ranges from about 0 to 50 weight percent of the polymer. At least a portion of the neutralizable groups $R_1$ are neutralized. When the amount of z is greater than zero, a portion of the groups $R_{10}$ can also be fully or partially neutralized, as desired.

Figure 2:
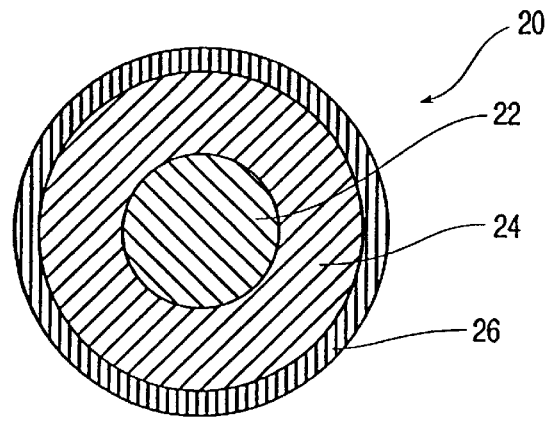
FIG. 2 is a cross-section of a golf ball according to the invention having an intermediate layer between a cover and a core.
Figure 3:
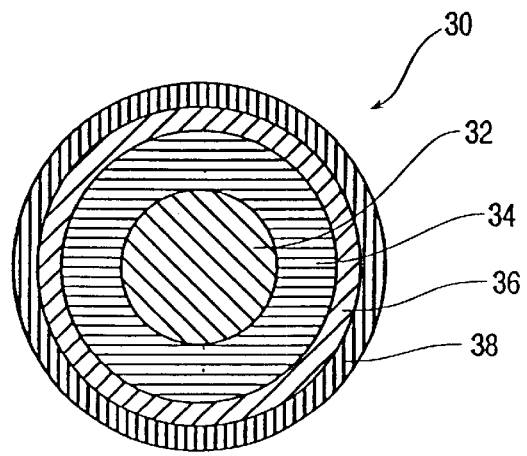
FIG. 3 is a cross-section of a golf ball according to the invention having more than one intermediate layer between a cover and a core.

The anionic polymer compositions of the present invention can be used in forming any golf ball components, i.e., in the cover, the center and/or one or more intermediate layer(s) and in any type of golf ball. Referring to FIG. 1, a golf ball 10 of the present invention can comprise a core 12 and a cover 16 surrounding the core 12. Referring to FIG. 2, a golf ball 20 of the present invention can comprise a center 22, a cover 26, and at least one intermediate layer 24 disposed between the cover and the center. In one embodiment, the intermediate layer 24 is an outer core layer, such that the core is formed from the center 22 and the intermediate layer 24 and the ball has a single layer cover 26. In another embodiment, the intermediate layer 24 is an inner cover layer, such that the cover is formed from the intermediate layer 24 and the cover 26 and the ball has a single layer center 22. Each of the cover, the core, and the optional intermediate layer(s) may also comprise more than one layer, i.e., the golf ball can be a conventional three-piece wound ball, a two-piece ball, a ball having a multi-layer core and/or a mantle layer or layers, etc. Thus, referring to FIG. 3, a golf ball 30 of the present invention can comprise a core 32, a cover 38, and intermediate layers 34 and 36 disposed between the cover and the core. Although FIG. 3 shows only two intermediate layers, it will be appreciated that any number of core, intermediate, or cover layers may be used, as desired.

The anionic polymer compositions can be used to form at least a portion of one or more layers of the golf ball, such as the cover or a portion of the cover, the core or a portion of the core, an intermediate or mantle layer or a portion thereof, etc. For example, the core of a golf ball may contain at least one solid, hollow, or fluid portion, but preferably the core contains at least one solid or fluid portion, and more preferably the core contains a solid or fluid portion. The golf ball may be prepared so that at least a portion of at least one of the core, the at least one intermediate layer, and the cover is foamed, includes a density-modifying filler, or both.

In particular, two-piece golf balls 10 having a cover 16 surrounding a core 12 are within the scope of the invention, wherein the cover 16, the core 12, or both the cover 16 and the core 12 comprise the anionic polymer compositions described herein. Further, wound golf balls, in which a fluid, semi-solid, or solid or hollow core is surrounded by a tensioned elastomeric material are also contemplated as being within the scope of the present invention. The fluid used in the core may be a liquid or a gas. Such anionic polymer components can also be used in golf balls 20 or 30 having multiple cover, core, and/or intermediate layers, and may be used in any one or more of such cover, core and intermediate layers. Preferably, at least the cover comprises an anionic polymer composition of the present invention.

Blends of two or more anionic polymer compositions described above are also included within the scope of the present invention.

Other polymers may also be used in golf balls according to the present invention, as conventionally used in any golf ball component, or combined with the anionic polymer compositions of the present invention. Thus, the anionic polymer compositions of the present invention can comprise compatible blends of at least one anionic polymer as described above and one or more additional polymers. Such blends can be formed using blending methods well known in the art.

In particular, the anionic polymer blends can comprise compatible blends of anionic polymers and ionomers, such as ethylene methacrylic acid ionomers, and ethylene acrylic acid ionomers, and their terpolymers, sold commercially under the trade names SURLYN® and IOTEK® by DuPont and Exxon respectively. The anionic polymer blends useful in the golf balls of the invention can also include other polymers, such as polyvinylalcohol, copolymers of ethylene and vinyl alcohol, poly(ethylethylene), poly(heptylethylene), poly(hexyldecylethylene), poly(isopentylethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers and poly(furan tetracarboxylic acid diimides), as well as the classes of polymers to which they belong.

The anionic polymer compositions of the present invention typically have a flexural modulus of from about 500 psi to 300,000 psi, preferably from about 2000 to 200,000 psi. The anionic polymer compositions typically have a hardness of at least about 15 Shore A, preferably between about 30 Shore A and 80 Shore D, more preferably between about 50 Shore A and 60 Shore D. The loss tangent, or dissipation factor, is a ratio of the loss modulus over the dynamic shear storage modulus, and is typically less than about 1, preferably less than about 0.01, and more preferably less than about 0.001 for the anionic polymer compositions measured at about 23° C. The specific gravity is typically greater than about 0.7, preferably greater than about 1, for the anionic polymer compositions. The dynamic shear storage modulus, or storage modulus, of the anionic polymer compositions at about 23° C. is typically at least about 10,000 dyn/cm$^2$, preferably from about $10^4$–$10^{10}$ dyn/cm$^2$, more preferably from about $10^6$ to $10^{10}$ dyn/cm$^2$.

When the anionic polymer compositions are combined with an additional polymer component, the additional polymer component is present in an amount of about 1 to 99 percent by weight, preferably about 5 to 80 percent by weight, based on the total weight of the anionic polymer and the additional polymer.

Further compositions may also be added to the anionic polymer components of the invention, such as, for example, coloring agents, reaction enhancers, crosslinking agents, blowing agents, dyes, lubricants, fillers (including density modifying fillers), excipients, process aids and other compounds commonly added to polymeric materials and/or golf ball compositions.

The composition of any golf ball component that does not contain the anionic polymer compositions disclosed herein can be any such composition known to those of ordinary skill in the art. Such compositions may be readily selected by those of ordinary skill in the art, for example, from one of the many U.S. Patents assigned to Acushnet Company. The resultant golf balls typically have a coefficient of restitution of greater than about 0.7, preferably greater than about 0.75, and more preferably greater than about 0.78. The golf balls also typically have a compression of at least about 40, preferably from about 50 to 120, and more preferably from about 60 to 100. As used herein, the term "compression" means as measured by an ATTI Compression Gauge. These gauges are well known to those of ordinary skill in the art and are commercially available from Atti Engineering Corp. of Union City, N.J.

The present invention relates to golf balls of any size. While USGA specifications limit the size of a competition golf ball to more than 1.68 inches in diameter, golf balls of any size can be used for leisure golf play. The preferred diameter of the golf balls is from about 1.68 inches to about 1.8 inches. The more preferred diameter is from about 1.68 inches to about 1.76 inches. A diameter of from about 1.68 inches to about 1.74 inches is most preferred. The cover of the golf balls typically has a thickness of at least about 0.03 inches, preferably 0.03 to 0.125 inches, and more preferably from about 0.05 to 0.1 inches. The golf balls also typically have at least about 60 percent dimple coverage, preferably at least about 70 percent dimple coverage, of the surface area.

Anionic polymer layers may be produced in golf balls in accordance with the present invention by various techniques which are known in the art, such as by injection molding or compression molding a layer of anionic polymer material about a previously formed center or core, cover, or intermediate layer. Cores comprising an anionic polymer composition may also be formed directly by injection molding or compression molding. When the layer or core is injection molded, a physical or chemical blowing or foaming agent may be included to produce a foamed layer, if desired. Blowing or foaming agents useful in forming foamed anionic polymer blends may be readily selected by one of ordinary skill in the art.

In a further embodiment, foamed anionic polymer blends may be formed by blending ceramic or glass microspheres with the anionic polymer either during or before the molding process. Polymeric, ceramic, metal, and glass microspheres are useful in the invention, and may be solid or hollow and filled or unfilled. Microspheres up to about 1000 micrometers in diameter are useful in the anionic polymer compositions of the invention.

For compression molded layers, half-shells made by injection molding an anionic polymer composition in a conventional half-shell mold or by compression molding commercially available sheets of anionic polymer compositions are used. The half-shells are placed about a previously formed center or core, cover, or mantle layer, and the assembly is introduced into a compression molding machine, and compression molded at about 250° F. to 400° F. The molded balls are then cooled while still in the mold, and finally removed when the layer is hard enough to be handled without deforming. Additional core, intermediate, and cover layers are then molded onto the previously molded layers, as needed, until a complete ball is formed.

After the final cover layer of the ball has been molded, the ball undergoes various conventional finishing operations such as buffing, painting and stamping, all of which are well known in the art.

Blending of the anionic polymer compositions and the optional additional polymers is accomplished in a conventional manner using conventional equipment. For example, a conventional injection molding machine may be used either to make preformed half-shells for compression molding or for molding flowable anionic polymer compositions using a retractable-pin mold.

The invention described and claimed herein is not to be limited in scope by the specific embodiments herein disclosed, since these embodiments are intended as illustrations of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

What is claimed is:

1. A golf ball comprising center and a cover disposed thereon, wherein at least a portion of the center comprises an anionic polymer comprising repeat units of formula Ia:

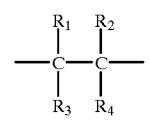

(Ia)

wherein $R_1$ is OH, $OC(O)R_5$, $O^-M^{+V}$, $(CH_2)_nR_b$, $(CHR_z)_nR_b$, or aryl, wherein n is at least 1, $R_5$ is a lower alkyl, M is a metal ion, V is an integer from 1 to 5, $R_b$ is OH, $OC(O)R_5$, $O^-M^{+V}$ and $R_2$ is a lower alkyl or aryl, $R_2$, $R_3$ and $R_4$ are each independently selected from the group consisting of hydrogen, straight-chain or branched-chain lower alkyl, and substituted alkyl in which one or more hydrogen atoms is replaced by a substituent selected from the group consisting of COOH, $SO_3H$, $NH_2$, or a lower alkyl substituted or di-substituted amine, halogen, OH, SH, silicone, and lower alkyl ether.

2. The golf ball of claim 1, wherein the anionic polymer further comprises at least one unit of formula Ib:

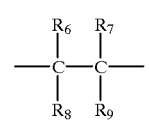

(Ib)

wherein $R_6$, $R_7$, $R_8$ and $R_9$ are each independently selected from the group consisting of hydrogen, straight-chain or branched-chain lower alkyl, and substituted alkyl, in which one or more hydrogen atoms is replaced by a substituent selected from the group consisting of COOH, $SO_3H$, $NH_2$ or a lower alkyl substituted or di-substituted amine, halogen, OH, SH, silicone, and lower alkyl ether.

3. The golf ball of claim 2, wherein the anionic polymer is a random, alternating or block copolymer of the units of formula Ia and formula Ib, wherein $R_1$ is OH or $OC(O)R_5$, and wherein $R_2$, $R_3$, $R_4$, $R_6$, $R_7$, and $R_9$ are hydrogen.

4. The golf ball of claim 2, wherein the units of formula Ia comprise from about 5 to 50 weight percent of the anionic polymer and the units of formula Ib comprise from about 95 to 5 weight percent of the anionic polymer.

5. The golf ball of claim 1, wherein the metal ion is selected from the group consisting of lithium, sodium, potassium, zinc, magnesium, titanium, tungsten, or calcium.

6. The golf ball of claim 1, further comprising at least one intermediate layer disposed between the center and the cover.

7. The golf ball of claim 6, wherein the intermediate layer comprises a tensioned elastomeric material.

8. The golf ball of claim 6, wherein the at least one intermediate layer comprises an anionic polymer having at least one neutralizable hydroxyl, deacetylable, or dealkylable ether group, wherein at least a portion of the neutralizable hydroxyl, deacetylable, or dealkylable ether group is neutralized, deacetylated, or dealkylated with a metal ion.

9. The golf ball of claim 1, wherein the cover comprises at least two layers and wherein at least one layer of the cover comprises the anionic polymer.

10. The golf ball of claim 1, wherein the cover has a thickness of about 0.03 inches to 0.125 inches.

11. The golf ball of claim 1, wherein the anionic polymer has at least one of a flexural modulus from about 500 psi to about 300,000 psi, a hardness of about 15 Shore A or greater, a specific gravity of about 0.7 or greater, a dynamic shear modulus of about $10^4$ dyn/cm$^2$ or greater, or a loss tangent of about 1 or less.

12. The golf ball of claim 6, at least one of the center, the at least one intermediate layer, or the cover is foamed, comprises a density-modifying filler, or both.

13. The golf ball of claim 1, further comprising at least one additional polymer selected from the group consisting of ionomers, polyvinylalcohol, copolymers of ethylene and vinyl alcohol, poly(ethylethylene), poly(heptylethylene), poly(hexyldecylethylene), poly(isopentylethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers, poly(furan tetracarboxylic acid diimides), and mixtures thereof.

14. The golf ball of claim 1, wherein the center comprises a core and an intermediate layer.

15. The golf ball of claim 6, wherein the intermediate layer is formed of the anionic polymer.

16. A golf ball comprising a core, a cover disposed concentrically about the core, and at least one intermediate layer disposed between the core and the cover, wherein the cover comprises a first cover layer and a second cover layer, and wherein at least one of the core or the at least one intermediate layer is formed of a composition comprising an anionic polymer comprising repeat units of formula Ia:

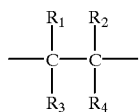

(Ia)

wherein R$_1$ is OH, OC(O)R$_5$, O$^-$M$^{+V}$, (CH$_2$)$_n$R$_b$, (CHR$_2$)$_n$R$_b$ or aryl, wherein n is at least 1, R$_5$ is a lower alkyl, M is a metal ion, V is an integer from 1 to 5, R$_b$, is OH, OC(O)R$_5$, O$^-$M$^{+V}$, and R$_z$ is a lower alkyl or aryl, R$_2$, R$_3$ and R$_4$ are each independently selected from the group consisting of hydrogen, straight-chain or branched-chain lower alkyl, and substituted alkyl in which one or more hydrogen atoms is replaced by a substituent selected from the group consisting of COOH, SO$_3$, NH$_2$, or a lower alkyl substituted or di-substituted amine, halogen, OH, SH, silicone, and lower alkyl ether.

17. The golf ball of claim 16, wherein the anionic polymer further comprises units of formula Ib:

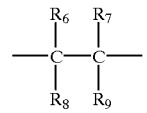

(Ib)

wherein R$_6$, R$_7$, R$_8$ and R$_9$ are each independently selected from the group consisting of hydrogen, straight-chain or branched-chain lower alkyl, and substituted alkyl, in which one or more hydrogen atoms is replaced by a substituent selected from the group consisting of COOH, SO$_3$, NH$_2$ or a lower alkyl substituted or di-substituted amine, halogen, OH, SH, silicone, and lower alkyl ether.

18. The golf ball of claim 16, wherein the at least one intermediate layer comprises a tensioned elastomeric material.

19. The golf ball of claim 16, wherein the first cover layer is formed of a composition comprising an anionic polymer having at least one neutralizable hydroxyl, deacetylable, or dealkylable ether group, wherein at least a portion of the neutralizable hydroxyl, deacetylable, or dealkylable ether group are neutralized, deacetylated, or dealkylated with a metal ion.

20. The golf ball of claim 16, wherein the first cover layer and the second layer each have a thickness from about 0.03 inches to about 0.125 inches.

21. The golf ball of claim 16, wherein the core comprises at least two layers and wherein at least a portion of the core is formed of the composition.

22. The golf ball of claim 16, wherein the anionic polymer has at least one of a flexural modulus from about 500 psi to about 300,000 psi, a hardness of about 15 Shore A or greater, a specific gravity of about 0.7 or greater, a dynamic shear modulus is about $10^4$ dyn/cm$^2$ or greater, a loss tangent of about 1 or less, or a combination thereof.

23. The golf ball of claim 16, further comprising at least one additional polymer present in an amount from about 1 weight percent to about 99 weight percent of the composition.

24. The golf ball of claim 23, wherein the at least one additional polymer is present in an amount from about 5 weight percent to about 80 weight percent of the composition.

25. The golf ball of claim 23, wherein the at least one additional polymer is selected from the group consisting of ionomers, polyvinylalcohol, copolymers of ethylene and vinyl alcohol, poly(ethylethylene), poly(heptylethylene), poly(hexyldecylethylene), poly(isopentylethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers, poly(furan tetracarboxylic acid diimides), and mixtures thereof.

26. The golf ball of claim 16, further comprising coloring agents, reaction enhancers, crosslinking agents, blowing agents, dyes, lubricants, fillers, excipients, process aids, or mixtures thereof.

27. A golf ball comprising a core, at least one intermediate layer disposed about the core, and a cover having an inner cover layer and an outer cover layer disposed concentrically about the intermediate layer, wherein at least one of the inner cover layer or outer cover layer and at least one of the core or the at least one intermediate layer are formed of a composition which comprises an anionic polymer comprising units of formula (II):

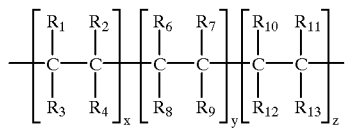

wherein:
R₁ is OH, OC(O)R₅, O⁻M⁺ⱽ, or substituted or unsubstituted $(CH_2)_n R_b$, $(CHR_z)_n R_b$, or aryl, wherein n is at least 1, $R_5$ is a lower alkyl, M is a metal ion, V is an integer from 1 to 5, $R_b$ is OH, OC(O)R₅, O⁻M⁺ⱽ, and $R_z$ is a lower alkyl or aryl;

$R_2$–$R_{12}$ are each independently selected from the group consisting of hydrogen, straight-chain or branched-chain lower alkyl, and substituted alkyl, in which one or more hydrogen atoms is replaced by a substituent selected from the group consisting of COOH, SO₃H, NH₂ or a lower alkyl substituted or di-substituted amine, halogen, OH, SH, silicone, and lower alkyl ether;

$R_{13}$ is OH or OC(0)$R_{14}$, where $R_{14}$ is a lower alkyl; x ranges from about 99 to 50 weight percent of the polymer, y ranges from about 1 to 50 weight percent of the polymer, and z ranges from about 0 to 50 weight percent of the polymer, and wherein the anionic polymer has a flexural modulus from about 500 psi to about 300,000 psi, a hardness of at least about 15 Shore A, a specific gravity of at least about 0.7, a dynamic shear storage modulus of at least about 10⁴ dyn/cm⁴ at about 23° C., a loss tangent of less than about 0.01 at about 23° C.

28. The golf ball of claim 27, wherein R₁ is OH or OC(O)R₅, and wherein R₂, R₃, R₄, R₆, R₇, R₈, and R₉ are hydrogen.

29. The golf ball of claim 27, wherein the outer cover layer and the intermediate layer are formed of the composition.

30. The golf ball of claim 27, wherein the intermediate layer comprises a tensioned elastomeric material.

31. The golf ball of claim 27, wherein at least one of the core, the at least one intermediate layer, the inner cover layer, or the outer cover layer is foamed, comprises a density-modifying filler, or both.

32. The golf ball of claim 27, wherein the outer cover layer has a thickness of about 0.03 inches to 0.125 inches.

33. The golf ball of claim 27, wherein the core comprises at least two layers.

34. The golf ball of claim 27, wherein the anionic polymer has a flexural modulus from about 2000 psi to about 200,000 psi, a hardness from about 30 Shore A to about 80 Shore D), a specific gravity of about 1 or greater, a dynamic shear storage modulus from about 10⁶ dyn/cm² to about 10¹⁰ dyn/cm² at about 23° C., a less tangent of less than about 0.01 at about 23° C.

35. The golf ball of claim 27, further comprising at least one additional polymer selected from the group consisting of ionomers, polyvinylalcohol, copolymers of ethylene and vinyl alcohol, poly(ethylethylene), poly(heptylethylene), poly(hexyldecylethylene), poly(isopentylethylene), poly(butyl acrylate), poly(2-ethylbutyl acrylate), poly(heptyl acrylate), poly(2-methylbutyl acrylate), poly(3-methylbutyl acrylate), poly(N-octadecylacrylamide), poly(octadecyl methacrylate), poly(butoxyethylene), poly(methoxyethylene), poly(pentyloxyethylene), poly(1,1-dichloroethylene), poly(4-[(2-butoxyethoxy)methyl]styrene), poly[oxy(ethoxymethyl)ethylene], poly(oxyethylethylene), poly(oxytetramethylene), poly(oxytrimethylene), poly(silanes) and poly(silazanes), polyamides, polycarbonates, polyesters, styrene block copolymers, polyetheramides, polyurethanes, main-chain heterocyclic polymers, poly(furan tetracarboxylic acid diimides), and mixtures thereof.

* * * * *